Jan. 23, 1968  M. FRANCOIS  3,364,847
METHOD AND MACHINE FOR TYING UP BUNDLES AND PACKETS
Filed May 2, 1966  9 Sheets-Sheet 1
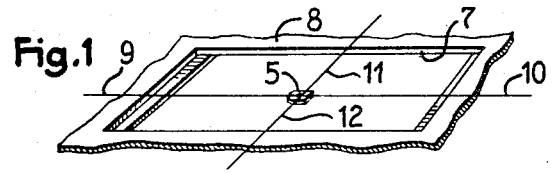
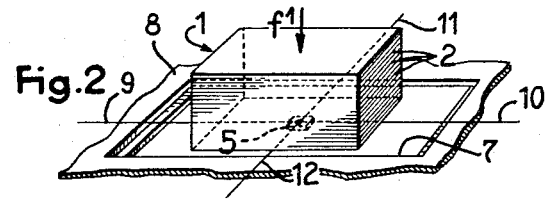
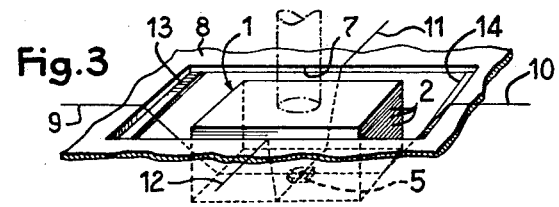
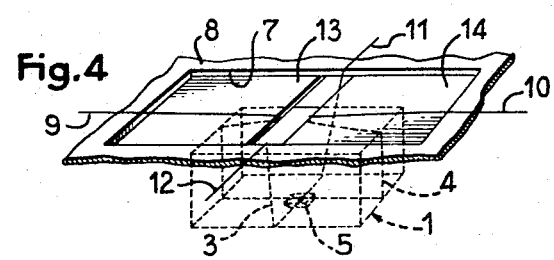
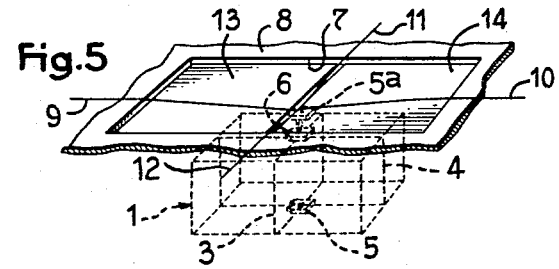
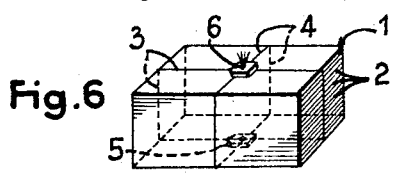

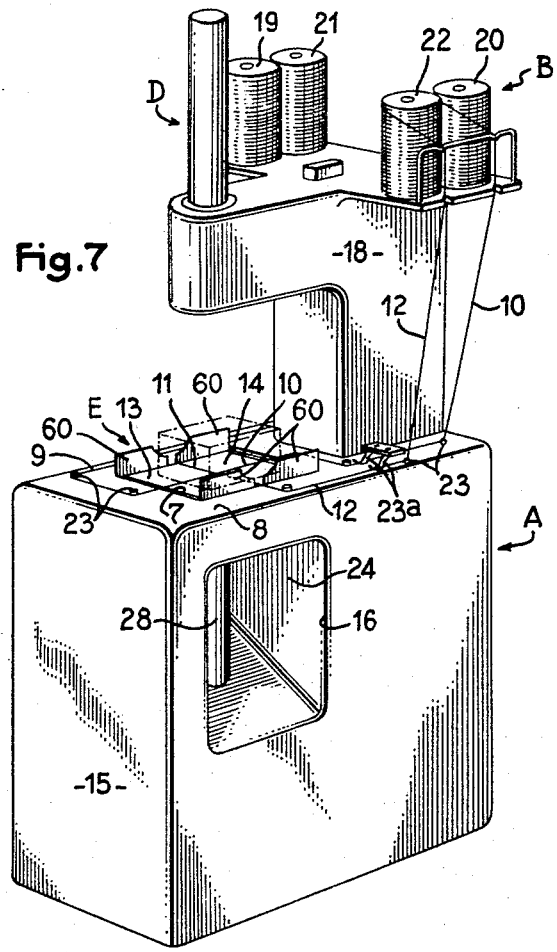
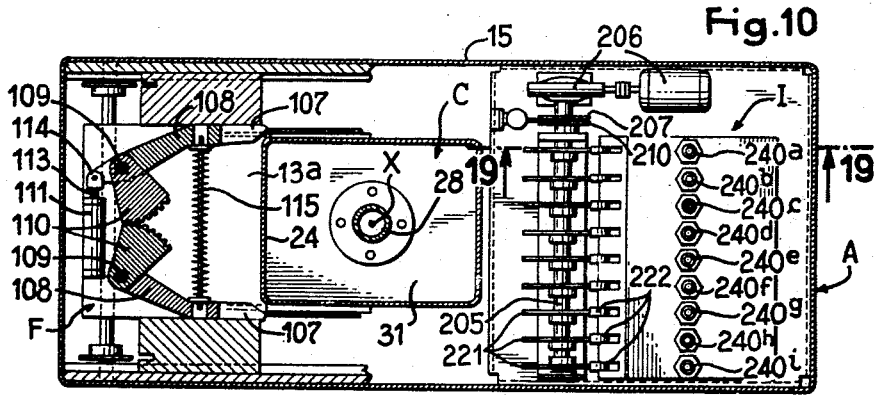

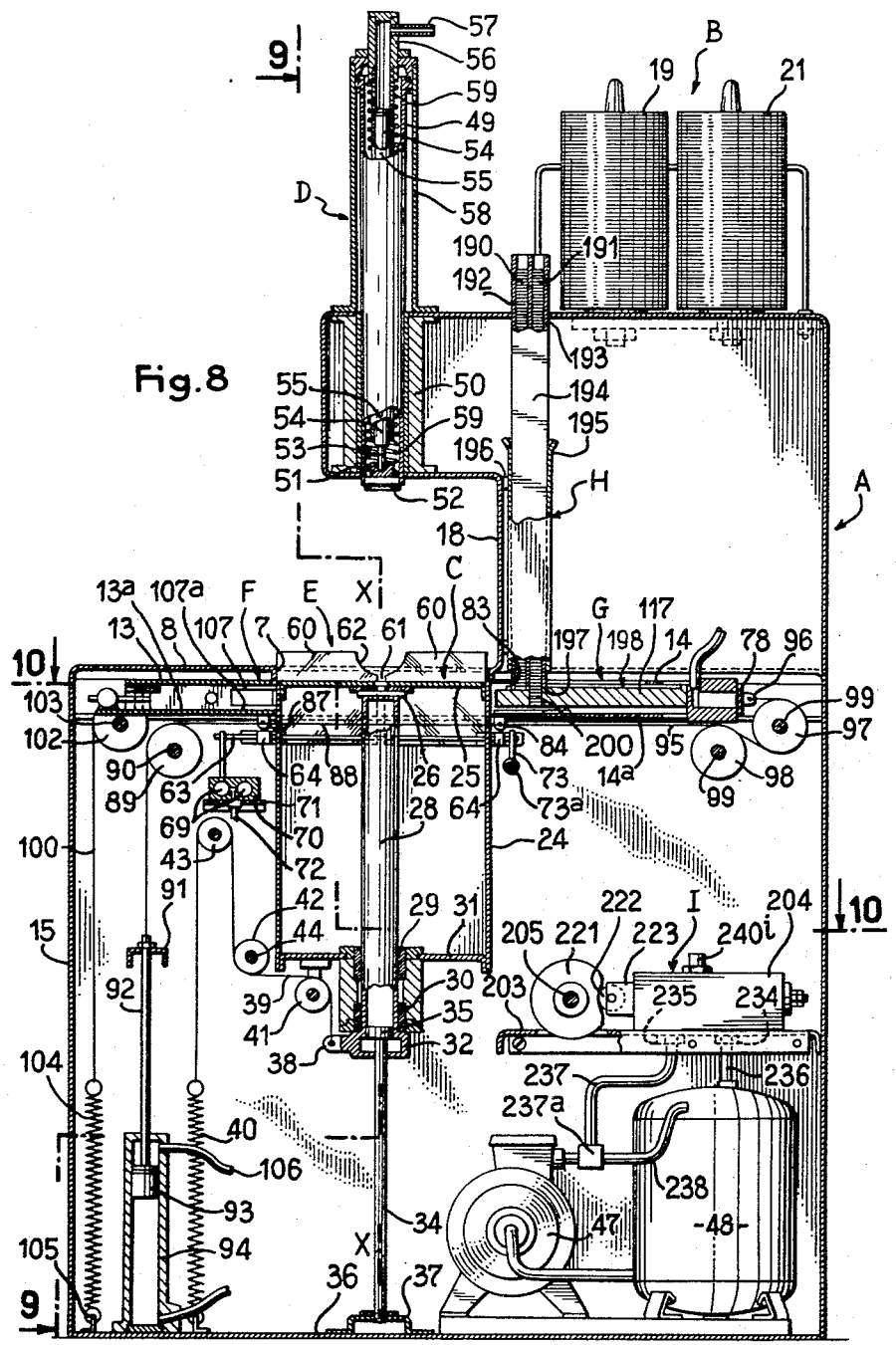

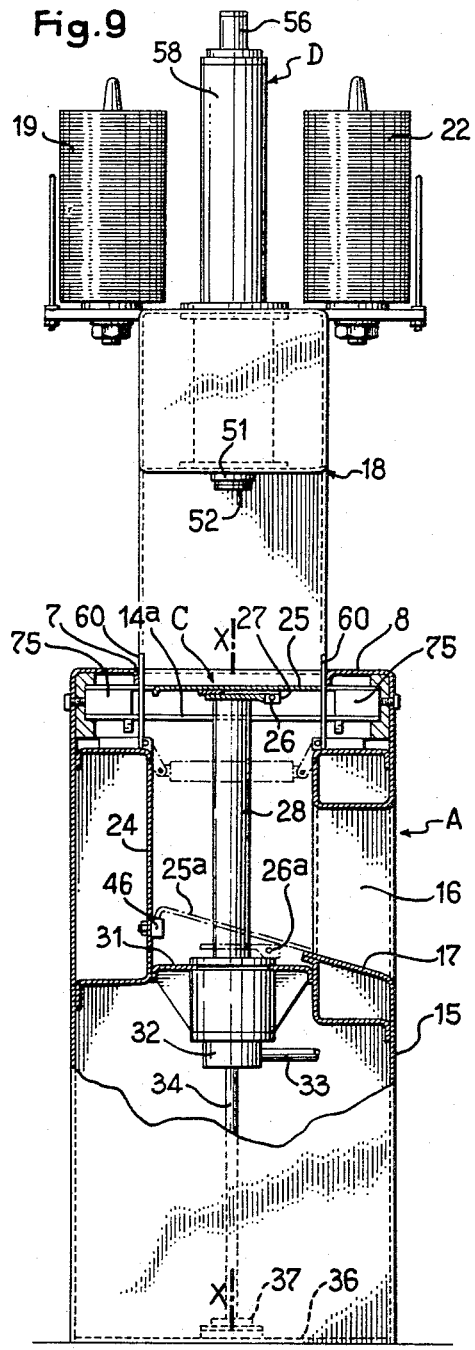

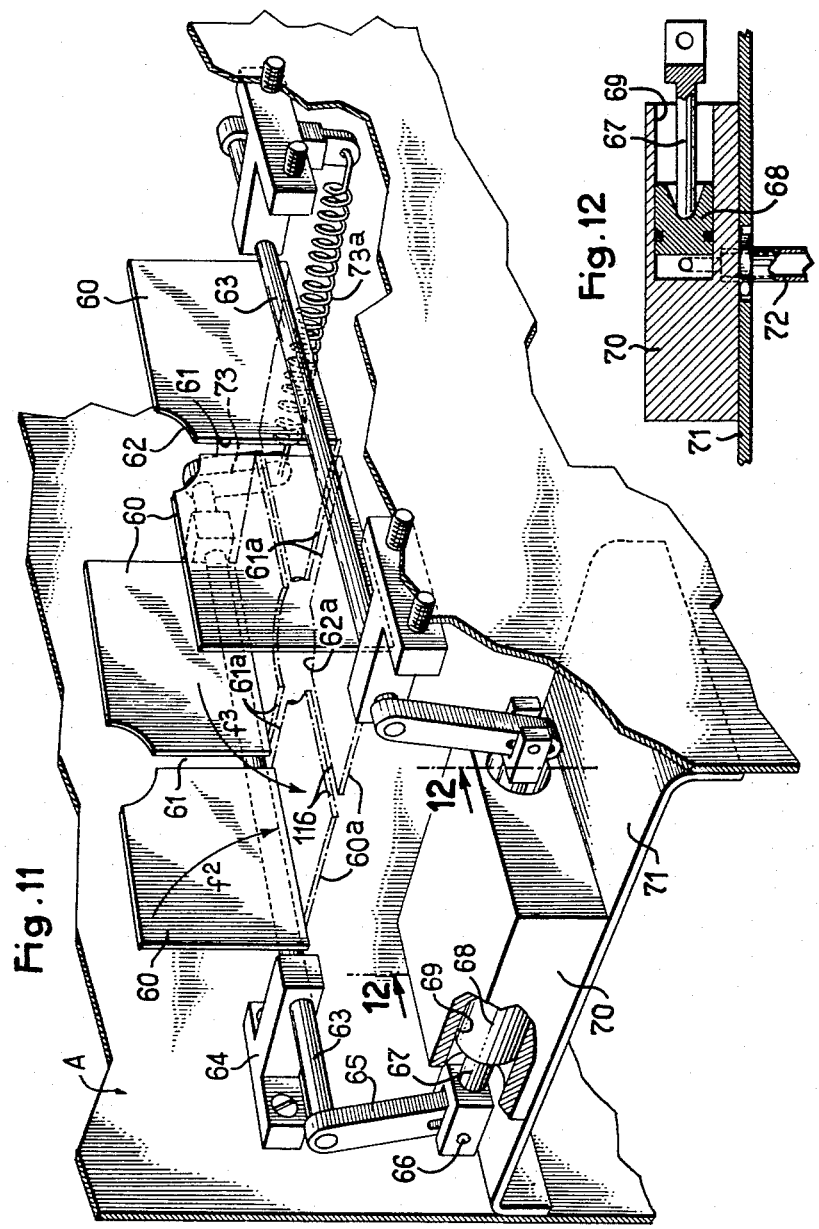

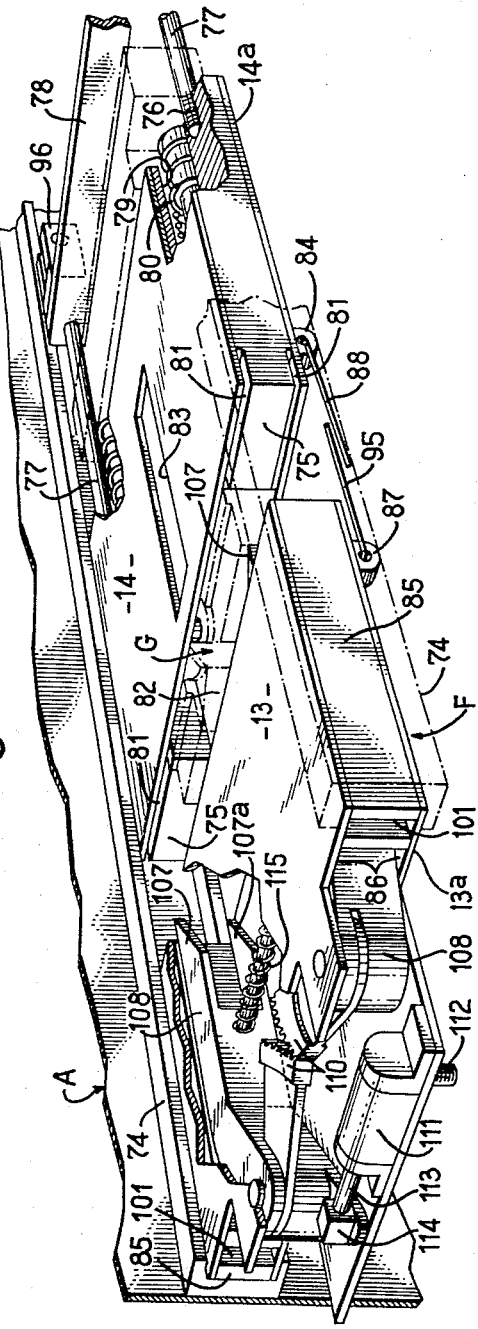

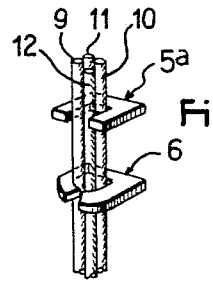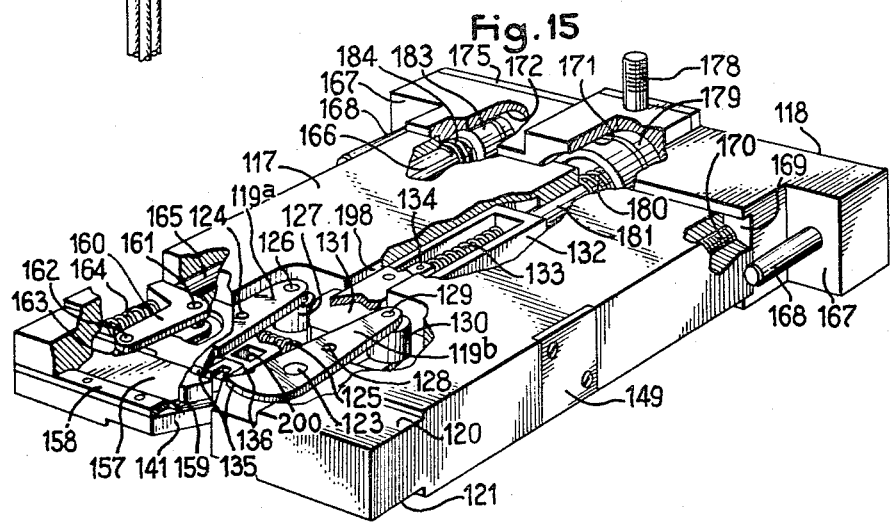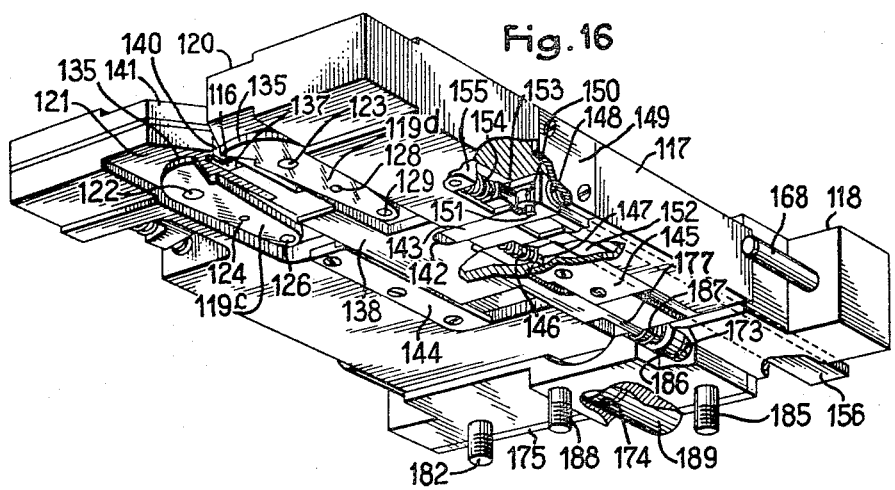

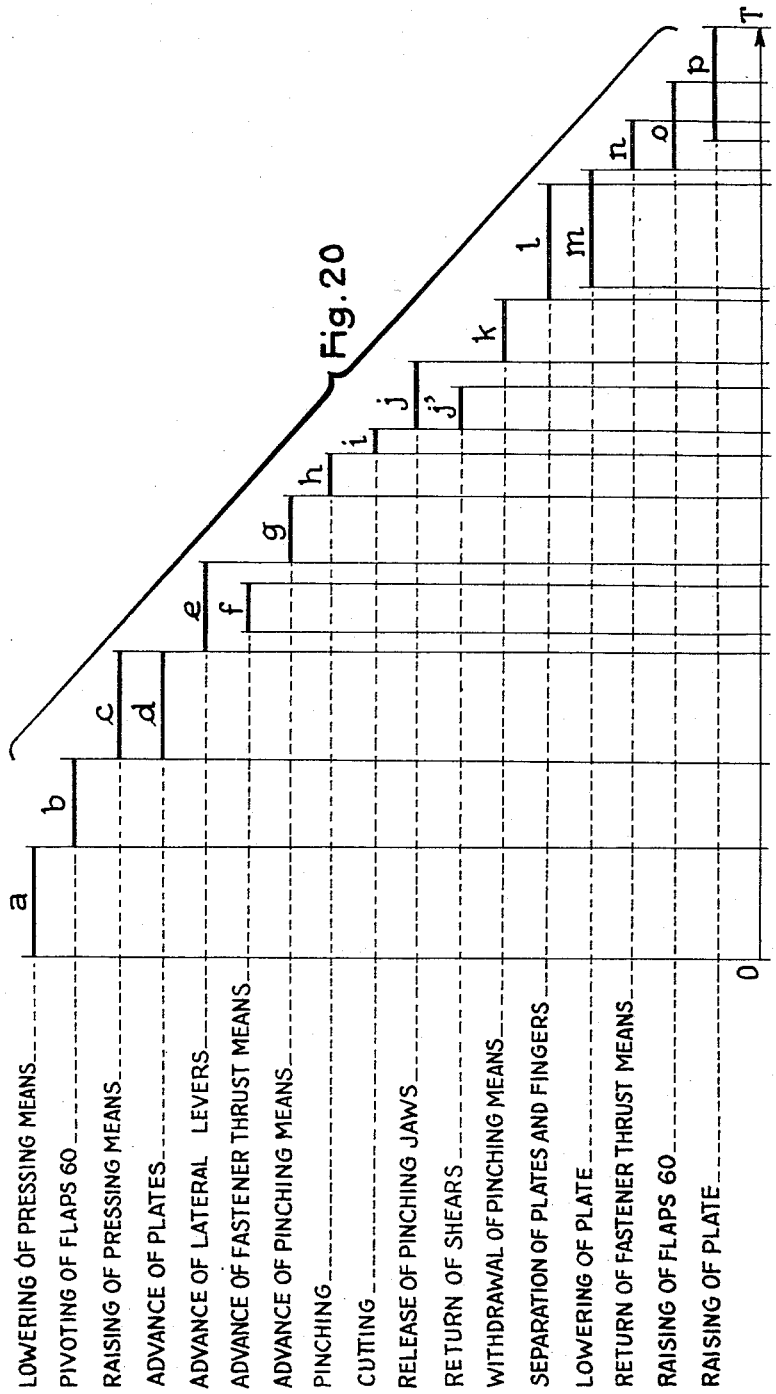

United States Patent Office 3,364,847
Patented Jan. 23, 1968

3,364,847
METHOD AND MACHINE FOR TYING UP BUNDLES AND PACKETS
Marcel François, Chatenay-Malabry, France, assignor to Hotchkiss-Brandt, Paris, France, a French body corporate
Filed May 2, 1966, Ser. No. 546,952
Claims priority, application France, May 5, 1965, 15,833
12 Claims. (Cl. 100—3)

ABSTRACT OF THE DISCLOSURE

A machine for tying bundles of articles comprising a downwardly movable and upwardly biased platform for receiving the bundle with the crossed flexible ties interposed between the bundle and platform, a fixed frame having an opening above which the platform is disposed, pressing means for compressing the bundle on the platform and urging the bundle downwardly through the opening so that the edges of the opening apply the ties against the sides of the bundle, means for forming the ties over onto the bundle, means for interconnecting the formed-over ties at an upper and a lower connection point and means for cutting the ties intermediate said two connection points.

---

The present invention relates to method and machines for binding or tying up bundles of for example, letters, notes, or forms which are to be put into heaps so as to give a certain rigidity to the mass formed by the bundle, piles of objects, for example similar to letters, and packets.

The ties or binders in current use are strings, wires, paper bands or any other ties composed of textile, plastics material or metal. Each tie is wound around the packet so as to constitute a loop, the two ends of the tie being interconnected by a knot, fastener adhesive or welding.

If the operation is repeated several times, it is usual to form either closed loops or independent rings, in which case each operation is completed by cutting the tie and interconnecting the ends of the section of the tie employed; or several coils each of which forms an open ring in which case only the last operation is complete with the cutting of the tie end and the interconnection of the ends of the section which formed the various coils or rings.

It is known that a ring of string or other tie around a packet had a tendency to slip off the packet. To avoid this, manual packers cross the ties, namely they form around the bundle or packet two rings of string or other tie intersecting at right angles and they rigidly interconnect them by means of a knot or other connection at each of the points of intersection, that is, on two opposite sides of the packet.

Known tying up machines carry out this work.

If the machine forms closed loops or separate rings, it is possible to form, in turning the packet through 90° between two operations, two crossed rings, but this requires two operations, the two rings are not rigidly interconnected and each is capable of sliding independently of the other.

If the machine is capable of forming several coils or turns, it is possible to obtain—by turning the packet through 90° between the two operations corresponding to the formation of the turns—the equivalent of the formation of two crossed rings, but these turns are rigidly interconnected at only one of their points of intersection. These turns are still capable of slipping (although this is more difficult than in the case of two independent rings) and two operations are still required.

In both cases, it is necessary that the packet be held and handled by an operator throughout the operations.

The object of the present invention is to remedy these drawbacks and to ensure in a single operation an entirely automatic formation of ties surrounding the bundle or other packet, without necessity of an operator, of at least one enclosed turn and generally of at least two closed turns or crossed rings interconnected at two points of intersection while permitting, in the more particularly contemplated case of bundles, a compression of the latter so as to tighten or render the solid formed by each bundle well compact, the rigid interconnection of the two rings at the two points of intersection rendering the slipping of the tie on the bundle or the packet very difficult and even impossible.

The invention provides an improved method for placing ties around a bundle or other packet of any height between two given limits.

The method according to the invention comprises arranging the ties in a star formation (for example in the form of a cross in the case of four ties), said ties being interconnected by a first connection and supplied continuously by feeding means to an opening of a frame, depositing the bundle or packet on said ties above said opening, exerting a pressure on the bundle so as to compress it and make it descend regardless of its height, below said opening, the edges of the latter automatically raising the ties towards the four lateral faces of the bundle, then placing the ties against said faces and on top of the bundle, forming the second connection and cutting the ties.

Preferably, the lower connection of the two superimposed connections constituting the second connection of the bundle or packet in course of binding (for example tying up with strings) and the upper connection constituting the first connection of the following bundle or packet—are effected simultaneously, and the ties are cut off between the two connection points.

Another object of the invention is to provide a machine for surrounding bundles or other packets with ties by means of the aforementioned improved method. This machine comprises in combination: a case whose upper wall is provided with an aperature; means for continuously feeding and guiding strings, or other flexible ties, so that these ties are pulled taut from a first connection point, in a star configuration on said aperture, a vertically movable platform below said aperture maintained in an upper position just below said ties by an elastically yieldable means, a vertically movable pressing means above said aperture for compressing the bundle deposited on said platform on top of said ties, so that the bundle and said platform move downwardly and the edges of the opening and the lower edges of the bundle raise the ties towards the lateral faces of the bundle, a mechanism under said upper wall of said case and below said opening for forming the ties over onto the top of the bundle, and a mechanism for interconnecting the ties at two neighbouring superimposed points of connection above the connection and cutting off the ties between said two points connection, the upper point constituting the first point of connection pertaining to the following bundle and the lower point the second point of connection of the bundle being tied up.

If the connecting means are fasteners, or clips, the two connecting means consist of two pairs of jaws of a fastener pinching means combined with fastener feed means feeding the fasteners from two fastener reserves or magazines.

In the case of bundles of for example, letters, notes or forms which are liable to rise, means are provided in the opening of the wall through which the bundle is lowered for pressing down on the bundle without hindering the movements of the ties.

Further features and advantages of the invention will be apparent from the ensuing description with reference to the accompanying drawings to which the invention is in no way limited.

In the drawings:

FIGS. 1–6 diagrammatically illustrate in perspective the successive stages of the method according to the invention;

FIG. 7 is a very diagrammatic perspective view of a bundle tying up or binding machine employing said method;

FIG. 8 is a vertical longitudinal sectional view of said machine;

FIG. 9 is a vertical section view taken along line 9—9 of FIG. 8;

FIG. 10 is a horizontal sectional view taken along line 10—10 of FIG. 8;

FIG. 11 is a perspective view, with parts cut away, of flaps and the control means therefor;

FIG. 12 is a partial sectional view taken along line 12—12 of FIG. 11;

FIG. 13 is a partial sectional view, with parts cut away, of devices for forming the four ties over on to the top of the bundle;

FIG. 14 is a perspective view of four united ties and two tie interconnecting fasteners, one before it is pinched together and the other after it has been pinched together;

FIG. 15 is a perspective view with parts cut away, of the top of the mechanism for feeding the fasteners, pinching the latter, and cutting the ties;

FIG. 16 is a view similar to FIG. 15 with parts cut away of the bottom of said mechanism;

FIG. 20 is a time chart corresponding to one cycle of the machine, namely to the tying up of one bundle.

I. DESCRIPTION OF THE METHOD (FIGS. 1–6)

Figure 17:
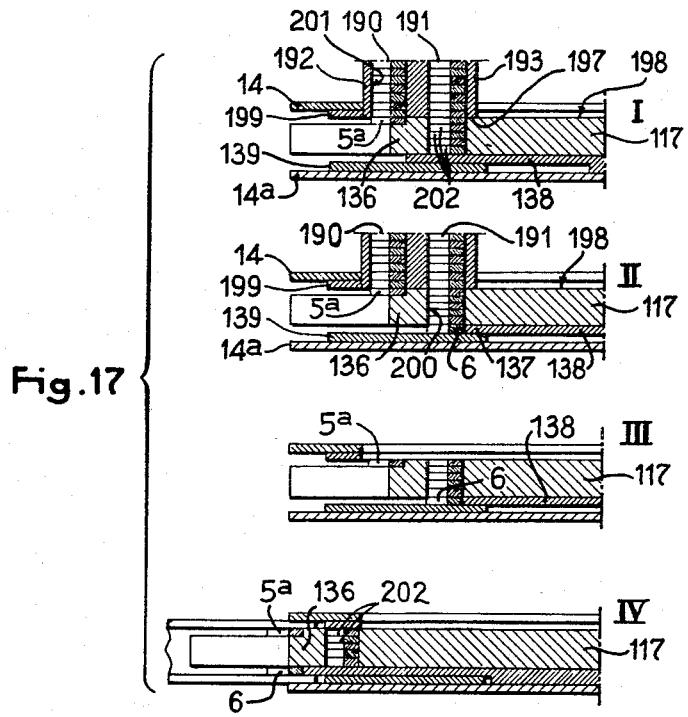
FIG. 17 shows vertical sectional views of the fastener feed devices in four successive positions.

The invention will be described in respect of the tying up or binding of a bundle 1 (FIGS. 2–6) consisting of a pile or stack 2 of letters or like documents. The object is to place around this bundle 1 two rings 3 and 4 of string or other flexible tie (FIG. 6) which are contained in two planes perpendicular to each other and interconnected at two points of connection by two fasteners or clips 5 and 6 located in the middle of the upper and lower faces of the bundle.

The operation is carried out in the region of an opening 7 which is formed in a fixed horizontal wall 8 and has such size that the bundle 1 can pass through this opening.

One cycle of the method comprises the following steps:

Four strings are held taut in a cross configuration on the opening 7. Two strings 9, 10 are the "longitudinal" strings (with respect to the rectangular shape of the bundle in plan) and two strings 11, 12 are the "transverse" strings. These four strings are interconnected by the first fastener or clip 5 which was placed in position in the last stage of the preceding cycle, as will be explained hereinafter. The strings 9–12 are in a taut condition but can give without ceasing to be taut owing to the manner in which they are fed, as explained hereinafter.

The bundle 1 to be tied up or bound is placed on these taut strings (FIG. 2).

Then a pressure is applied in the direction of arrow $f^1$ on the bundle so as to cause it to pass through the opening 7 while it is supported from underneath as will be explained hereinafter. The bundle draws along therewith the four taut strings, appropriate lengths of which are fed by their feed devices. The four strings are therefore swung up in the direction of the lateral faces of the bundle (FIG. 3).

Then, when the bundle has passed below the wall 8, two slidable plates 13, 14 move towards each other (FIG. 4) so as to form the longitudinal strings 9 and 10 over against the corresponding lateral faces and onto the top of the bundle.

Thereafter, two pivotable levers, described hereinafter likewise form the transverse strings 11 and 12 over against the corresponding lateral faces and onto the top of the bundle.

The four strings then comprise, in the part thereof following on the two formed rings 3 and 4, four vertical adjoining string portions (FIGS. 5 and 14).

These four string portions are then connected by two fasteners 6 and 5a which are pinched or clamped onto the four string portions, as shown in FIG. 14 in respect of the fastener 6. The fasteners 6 and 5a are spaced a sufficient distance apart for it to be possible to section the string portions therebetween. The bundle 1 is now tied up or bound and can be discharged below the wall 8 while the remainder of the strings interconnected by the fastener 5a (which will constitute the first fastener interconnecting rings adapted to tie up or bind the following bundle) resume the cross configuration shown in FIG. 1 ready for the following cycle of the method.

A tying up or binding machine for carrying out the said method will now be described in detail.

II. DESCRIPTION OF THE MACHINE

According to the illustrated embodiment the machine for tying up or binding bundles or other packets comprises in combination (FIGS. 7–10) a support or frame A and, disposed on or in the latter:

String feed and guide means B.

A platform C receiving the bundle with associated mechanism for shifting it vertically.

An upper pressing means D for pressing on the bundle.

Retaining means E bearing on the bundle so as to prevent the top letter from rising.

Mechanism F for forming the strings over against the lateral faces and onto the top of the bundle.

A mechanism G for depositing simultaneously two fasteners and cutting the strings between the two fasteners.

Double distributing means H for distributing the fasteners to the mechanism G.

A mechanism I for driving the machine cycle by cycle. Each of these parts of the machine will now be described.

*(a) Support A*

It comprises a lower case 15 one of the large vertical sides of which has as opening 16 for the discharge of the tied up or bound bundles which slide on an inclined wall 17 (FIG. 9). This case has an upper wall 8 in which is formed the opening 7. The support A further comprises a post 18.

*(b) String feed means B*

The means B comprise four reels or balls 19–20 supplying the strings 9–12. The strings pass around various rollers generally indicated by the reference numeral 23 (FIG. 7), and in two tension-adjusting devices 23a and assume a cross figuration (interconnected by the fastener 5, FIG. 1) on the opening 7 of the wall 8.

*(c) Receiving platform C*

In the support A the platform C is vertically movable within a vertical pit 24 (FIGS. 7–10) opening onto the wall 8 by way of the opening 7. This platform comprises a plate 25 (FIGS. 8 and 9) pivoted at 26 on a fork 27 forming the upper head of a hollow cylindrical body 28. This body is slidably mounted in rings 29 and 30 (FIG. 8) fixed to a member 31 rigid with the support A. A member 32 constitutes the lower end of the cylinder 28. It is provided with a pipe 33 and has a bore equipped with sealing means to permit the fluidtight movement of a rod 34 carrying at its upper end a piston 35 itself provided with sealing means for sliding in the cylinder 28. The rod is connected to the bottom 36 of the support by a member 37.

The member 32 further comprises a boss 38 to which is connected one of the ends of a chain 39 (FIG. 8) held taut by a spring 40. This chain extends around in succession sprocket wheels 41, 42 and 43. The sprocket wheel 41 rotates in a fork fixed to the member 31. The other two sprocket wheels rotate on spindles, such as 44, carried by the support A through forks (not shown).

The spring 40 is a tension spring and has an effective travel exceeding the possible travel of the cylinder 28. It pulls on the latter vertically upwardly through the boss 38 and the end 32 and causes it to slide in the rings 29 and 30 and occupy, together with the plate 25, the upper position shown in FIG. 7 and 8.

It will be understood, moreover, that if a liquid under pressure is fed into the space between member 32 and the piston 35 the resulting force will tend to move the piston 35 away from the member 32, but as the piston is fixed in space, owing to the fact that the rod 34 is retained by the member 37 and the bottom 36 of the support A, it is the member 32 which moves downwardly and draws along the cylinder 28, the member 27 and the plate 25. Before reaching the lower end-of-travel, the plate 25, encounters a fixed abutment 46 (FIG. 9) rigid with the support and this causes the plate 25 to tilt to the position shown in dot-dash line at 25a (FIG. 9) about the spindle 26 which reaches the position 26a.

The downward movement pulls on the chain 39 which puts the spring 40 under tension so that when the fluid fed through the pipe 33 ceases to be under pressure, the platform assembly C resumes its upper position, said fluid being discharged from the cylinder 28 by way of the pipe 33.

It will be explained hereinafter how the liquid pressure is controlled, but it should be mentioned now that this occurs when the supply pipe 33 is in communication with a motor-pump unit 47 which is fed from a tank 48. The pressure drops to zero when the pipe 33 is in communication with the tank 48 (FIG. 8).

(d) *Pressing means* (FIGS. 8 and 9)

It comprises a hollow column 49 which is slidable in a sleeve 50 rigid with the post 18 of the support A. Below the lower end of this sleeve, a lower member 51 fixed to the column 49 carries a pressure ring 52 and a pivotal connection of a rod 53 which is connected to a piston 54 provided with sealing means. This piston is movable in a cylindrical body 55 terminating at its upper part in a member 56 provided with a pipe 57. The member 56 is held in position in the bottom of a tubular housing 58 fixed to the post 18. The member 56 carries grooves for anchoring the upper end of a tension spring 59 whose lower end is connected to the member 51 of the lower part of the column 49.

It will be understood that the spring 59 tends to return the column 49 to its upper position and that if a liquid under pressure is supplied by way of the pipe 57, the piston 54 descends in the cylinder 55 and causes, through the rod 53, the descent of the column 49 and pressure ring 52.

When the pressure of the liquid ceases, the spring 59 raises the column and the liquid is discharged by way of the pipe 57.

(e) *Retaining means E* (FIGS. 7, 8, 11, 12)

This device is adapted to prevent the letter or other top document of the bundle to rise on more or less bend up in one or several of its corners after the pressing means D has risen. It comprises two pairs of retaining flaps 60.

The two flaps of each pair are separated by a gap 61 adapted to allow the free passage of the string 11 or 12 and this gap is enlarged at 62 towards the free edges of the flaps.

Each pair of flaps 60 is fixed to either of two parallel shafts 63 which are journalled in members 64 fixed inside the support A. Each of the shafts 63 carries at its front end a lever, such as 65, to which is pivoted at 66 the fork of a connecting rod 67. The latter is connected to a piston 68 provided with sealing elements and sliding in a blind bore 69 formed in a block 70 fixed to a crossmember 71 of the support. The block 70 comprises two bores 69 one of which is open on the left side and the other on the right side as viewed in FIG. 11. These bores are in communication with a pipe 72 (FIG. 12) by way of suitable passageways.

Further, fixed on the rear end of each of the shafts 63 is a lever 73. The two levers are interconnected by a tension spring 73a. The lengths and the setting of the flaps and the levers are such that under the action of the spring 73a, the flaps are vertical and define therebetween a space allowing the free passage of the plate 25 of the platform C. If liquid under pressure is fed by way of the pipe 72 to the cylinders 69, the pistons 68 are shifted and cause the connecting rods 67 to rotate the shafts 63 through a quarter of a revolution in the direction indicated by the arrows $f^2$ and $f^3$ (FIG. 11) so that the flaps assume the horizontal position shown in 60a, their notches defining at 62a a free center space.

On the other hand, when the pressure ceases, the spring 73a causes the flaps to resume their vertical positions and the liquid is discharged by way of the pipe 72.

(f) *Mechanism F for forming the strings over against and onto the top of the bundle* (FIGS. 7–10, and 13)

This mechanism comprises two devices, one pertaining to the longitudinal strings 9 and 10 (FIGS. 1–6) and the other to the transverse strings 11 and 12.

The strings 9 and 10 are formed over by two pairs of plate 13–13a and 14–14a respectively (see also FIGS. 4 and 5). The twin plates of each pair move in two slideways 74 rigid with the support A. The right or rear plates 14 and 14a are spaced apart by two lateral members 75. These members each comprise towards the rear, a tapped hole 76 for fixing a rod 77, the two parallel rods acting as a support for an abutment bar 78 (FIGS. 8 and 13) and a blind hole 79 acting as a housing for a return spring 80 for the mechanism G, which will be described hereinafter and pinches the fasteners and cuts the string.

Towards the front part, the lateral members 75 have notches 81 which permit the movement of elements constituting the device described hereinafter for forming over the lateral strings 11, 12. The longitudinal space 82 between the members 25 and the plates 14, 14a receives the aforementioned mechanism G which is freely slidable therein.

Formed in the upper plate 14 is an aperture 83 which permits the end of the fastener distributing means H to adjoin the mechanism G (FIG. 8) during the entire travel of the plates. Further, two chain anchoring members 84 are fixed to the lower part of the assembly of the rear plates 14, 14a.

The left or front plates 13 and 13a (FIGS. 8 and 13) are held apart by two members 85 and slide in the two slideways 74. The space 86 thus formed serves as a housing for and the control of the device forming over the transverse strings 11, 12, as will be explained hereinafter. Two members 87 for anchoring a chain are fixed to the lower part of the assembly of the front plates 13, 13a.

The alternating movements in opposite directions of the pairs of plates 13, 13a and 14, 14a are controlled in the following manner:

Disposed on each side of the opening 7 of the wall 8 are firstly, two control chains 88 which are anchored to the rear plates 14, 14a by the members 84, these chains extending around sprocket wheels 89 rotatably mounted on a cross-member 90 of the support, the other end of these chains being fixed to the balancing or swing bar 91 which is connected through a rod 92 to the piston 93 of a jack 94; secondly, two connecting chains 95 which are anchored in forks 96 (FIGS. 8 and 13) which are rigidly secured to the rear plates 14, 14a through rods 77 and anchored to the members 87 rigid with the front plates 13, 13a after extending around sprocket wheels 97, 98 rotatably mounted on cross-members 99; two return chains 100 anchored in the front plates 13, 13a inside slots 101 and extending around sprocket wheels 102 rotatably mounted on a cross-shaft 103, these chains being held taut by tension springs 104 attached at 105 to the bottom 36 of the support A.

It can be seen that if liquid under pressure is supplied by way of the upper pipe 106 of the jack 94, the force exerted on the piston 93 transmitted through the rod 92, the swing bar 99 and the chain 88, will tend to shift the rear plates 14, 14a in the direction of the axis X—X of the platform. These plates transmit the same force and the same travel through the chain 95 to the front plates 13 and 13a which thus move towards this axis X—X the same distance as the plates 14, 14a.

Abutments (not shown) are provided for limiting these travels so that the minimum gap between the two pairs of plates 13, 13a and 14, 14a remains slightly greater than the diameter of a string.

The front plates 13, 13a in moving towards the axis X—X pull on the chains 100 which put the springs 104 under tension. Consequently, as soon as the pressure of the liquid ceases in the jack 94, the plates resume under the action of these springs 104 their initial separated positions and the liquid is expelled by way of the pipe 106.

The device for forming over onto the bundle the two transverse strings 11, 12 will now be described. It comprises two lateral pairs of fingers, namely an upper finger 107 and a lower finger 107a (FIGS. 8, 10, 13) disposed in the space 106 between the front plates 13, 13a and adjacent the inner faces of the latter. They are rigidly connected in pairs with either one of the two levers 108 pivotably mounted on pins 109 carried by the plates 13 and 13a.

These two levers are symmetrically disposed relative to the longitudinal axis of the plates and have movements which are also symmetrical owing to the provision of two gear sections 110 which are meshed together and shifted by a jack 111 fixed to the plate 13a and provided with a pipe 112 (FIG. 13) and a piston (not shown) whose rod 113 acts on an abutment 114 rigid with one of the levers 108.

As will be understood, when liquid under pressure is supplied by way of the pipe 112 the force exerted on the piston is transmitted through the rod 113 and the abutment 114, and causes the levers 108 to pivot towards each other and shift the two pairs of fingers 107, 107a towards each other. A compression spring 115 has each end disposed in a cavity in the lever 108 and ensures that the various elements return to their position of rest when the pressure of the liquid ceases in the jack 111.

Before continuing the description of the machine, the operation of those elements thereof just described will be described in detail.

When the bundle 1 to be tied up or bound is placed on the platform C on top of the four strings 9, 10, 11, 12 provided with the fastener 5 (which has been placed in position in the preceding operation) and the machine is started up, hydraulic fluid under pressure is supplied to the pipe 57 of the pressing means D (FIG. 8) and this lowers the pressure ring 52. The latter encounters the bundle in its downward travel and, as this travel is constant and adjusted for this purpose, the ring compresses the letters which urge downwardly the plate 25 (which thus extends the spring 40) and the ring 52 thus brings the top letter of the bundle to a level slightly lower than that of the flaps 60 in their horizontal position 60a (FIG. 11). The four strings on which the bundle rests follow the bundle in its downward movement and are applied against its lower face and partially raised around the lower edges or corners of the bundle (FIG. 3). At this moment, putting the hydraulic fluid in the pipe 72 under pressure (FIG. 12) pivots the flaps 60 which move to the horizontal position 60a and puts the circuit of the pipe 67 in communication with the liquid tank and the spring 59 urges the pressing means D towards its upper position. As soon as the latter has left the bundle, putting under pressure the circuit relating to the pipe 106 (FIG. 8) causes the plates 13, 13a and 14, 14a to move towards each other, the springs 104 are put under tension and longitudinal strings 9, 10 are formed over against the corresponding lateral faces and onto the top of the bundle in the longitudinal gap 116 (FIG. 11) remaining between the flaps which are lowered to the position 60a.

At the end of the travel of the plates 13, 13a, 14, 14a, the ends of the fingers 107, 107a engage outside the lateral strings 11 and 12. Putting the circuit relative to the pipe 112 (FIG. 13) under pressure moves the fingers together while compressing the spring 115 and forms over these lateral strings against the corresponding lateral faces and onto the top of the bundle in the gaps 61 between the flaps in their position 60a.

It can be seen that in the gap between the upper and lower plates, the strings 9, 10, 11, 12 travel in side-by-side and parallel relation and, in order that they be situated relative to the bundle as shown in FIG. 5, they should be interconnected by a fastener at two points between the lower and upper plates. To effect this, the mechanism G comes into action but, before describing this, it should be mentioned that the fasteners, before they are pinched over, are composed, as seen in FIG. 14 in respect of the fastener 5a, of a small square flat piece of malleable metal having a rectangular notch 116 whose area is slightly greater than the cross-sectional area of the four strings to be interconnected.

To connect the strings, it is sufficient, after insertion of the strings into the notch, to deform or pinch (by exerting a simple pressure) the two lateral parts of the fastener. The notch closes (see fastener 6 in FIG. 14) and assumes a triangular shape. The trapped strings are highly compressed and can no longer move or slide relative to each other.

(g) *Mechanism G for mounting and pinching the fasteners and cutting the strings (FIGS. 8, 15, 16)*

It comprises two main parts:
A front block 117 or pinching means carrying block.
A rear or control block 118.

The block 117 is a massive piece of metal having such thickness and width that it is slidable in the space 82 between the plates 14, 14a and their spacer members 75. A number of openings are formed in this block so as to clear the following elements: four jaws, a cam, a fastener thrust means, a lock, and a shears, which will now be described in turn.

*Jaws.*—Four pinching jaws 119a, 119b, 119c, 119d are provided in opposed relation in pairs and located tangent or alongside either the upper plane 120 or the lower plane 121. The jaws 119a, 119c are pivoted about a pin 122 which is a drive fit in the block 117. Similarly, the jaws 119b, 119d are pivoted about a pin 123. Whereas the first-mentioned jaws are braced by a pin 124 serving as an attachment for the end of an extension spring 125 and by a pin 126 on which a roller 127 is rotative, the second jaws are braced by a pin 128 serving as an attachment for the other end of the spring 125 and by a pin 129 carrying a roller 130.

*Cam.*—This cam 121 has a profile or cam surface along which roll rollers 127, 130 urged thereagainst by the spring 125. The cam is slidable in a slot in the block 117. It comprises, on the major part of its length, an aperture 132 in which is located a compression spring 133 which bears against an abutment 134 rigid with said block 117. Under the effect of this spring 133, the cam 131 is normally in the withdrawn position in abutment with the abutment 134 and it thus presents the narrowest part of its profile between the rollers. Consequently, the nose portions 135 at the forward ends of the jaws 119a, 119b, on the one hand, and 119c and 119d on the other, are slightly separated. In this position, there is just enough space between the upper nose portions, a boss 136 of suitable shape, the block 117 and the upper plate 14 for accommodating a fastener or clip. There is also room for another fastener or clip between the lower nose portions, the end 137 (FIG. 16) of the fastener thrust means 138 in the pinching position (which will be described hereinafter), an element 139 (also described hereinafter and shown in sectional views I and II of FIG. 17) and the lower plate 14a. The manner in which the fasteners take up their positions in each of the two housings will be explained hereinafter.

The fastener pinching operation will now be easy to understand when it is realised that these fasteners always present their notch 116 directed forwardly, the edge opposed to this notch bearing against the boss 136 or the end 137 of the fastener thrust means, that the upper and lower fasteners are in vertical alignment with each other and that a vertical recess 140 having a V-shaped entrance 141 permits four strings which are grouped close together and vertically under tension to pass simultaneously into the notch 116 of two superposed fasteners 6, 5a (FIGS. 5 and 14) which are subsequently pinched closed. Indeed it is sufficient to shift the cam 131 to overcome its return spring 131 to cause its profile to move between the rollers 127 and 130 and pivot the jaws and move the nose portions 135 towards each other in pairs.

The fasteners cannot move rearwardly owing to the presence of the boss 136 and the fastener thrust means 138 (held stationary) and it is the lateral portions of the notch of each fastener which give way and are deformed under the effect of the nose portions 135 so that the fasteners surround the strings and hold them stationary with respect to each other.

*Fastener thrust means.*—This thrust means 138 comprises the thrust element proper which is a long flat member slidable in a recess in the lower face of the block 117. The ends are slightly offset since one of them, 137, is in the centre of the assembly of the pinching means and has a suitable shape similar to that of the boss 136 for receiving and acting as a support for the edge of the lower fastener 6 opposed to the notch 116, whereas the other end is facing a piston of the control block describe hereinafter.

The thrust element 138 has in one of its longitudinal edges a notch 142 in which is engageable a locking element 143. The position and shape of the notch and of the locking element are such that when a locking occurs the thrust element 138 can no longer move rearwardly and its end 137 is located exactly immediately below the boss 136. Further, two screwed guides 144, 145 prevent the thrust element from leaving the recess when the pinching means are removed from the plates 14, 14a and a compression spring 146, disposed in an aperture in the block 117 and exerting its force between the latter and an abutment 147 secured to the thrust element 138, biases the latter towards the control block 118.

The locking element 143 is also slidable in a recess in the block 117 and it is biased to its operative position by a compression spring 148 which is located in the same recess and bears against an inserted plate 149 secured by screws to the lateral face of the block 117. The locking element comprises an aperture in which a roller 150 is rotatable about a trapped pin 151 and through which extends a flat bar 152 provided at its end with a ramp 153 against which the roller 150 bears. This end of the bar is machined in such a manner as to center a compression spring 154 which bears against an abutment 155 rigid with the block 117. The spring 154 and the bar 152 are located in a recess in the block and the bar is retained by the aforementioned guide 145. It is of such length that its rear end 156 extends through the control block 118 and reaches the abutment bar 78 (FIG. 8) when necessary.

It will be understood that when this end 156 of the bar is depressed the spring 154 is compressed and the ramp 153 is shifted under the roller 150. The ramp is such that, as a consequence, the locking element 143 compresses its spring 148 and withdraws from the notch 142 in the thrust element 138 so as to release the latter.

*Shears.*—It comprises a blade 157 which is slidable in a groove formed in the thickness of the block 117 and is retained by a stop member 158. The end 159 of the blade is sharpened obliquely and the sharp edge thus provided is capable of passing through the vertical recess 140 when the blade is actuated by a split cranked lever 160 which is pivoted about a pin 161 and has a lug 162 engaged in a recess 163 in the blade or shear 157.

The pin 161 is fixed in the block 117 and a series of recesses and cavities are formed in the latter so as to permit the movement of the lever 160 and accommodate a compression spring 164 which bears against this block 117 and acts on the lateral branch of the lever 160 in such manner that the sharp edge 159 of the blade 157 moves away from the recess 140.

A rod 165 extends rearwardly in the block 117 in such position that, when its rear end 166 is depressed, the lateral branch of the lever 160 is shifted by the rod, compresses the spring 164 and shifts the blade 157 in such manner that the sharp edge 159 travels across the recess 140.

The rear or control block 118 also consists of a massive piece comprising at each end a recess 167 in which is screwed a rod 168 serving to center each of the return springs 80 (FIG. 13) of the mechanism G. Formed in its front face is a recess 169 in which is engaged the block 117, the latter being fixed in the recess 169 by screws 170 (FIG. 15). Four bores or apertures 171, 172, 173, 174, acting as hydraulic receiving cylinders, are provided in this block 118. Three of the cylinders are closed at the rear by a plate 175 which is attached by screws and provided with suitable seals. One cylinder 174 is closed at the front by the block 117 with interposition of a seal.

The positions of these bores in the block 118 are as follows:

The cylinder 171 is coaxial with the cam 131.
The cylinder 172 is coaxial with the rods 165, 166.
The cylinder 173 is coaxial with the rear end 177 of the thrust element 138.
The cylinder 174 is located as near as possible to the longitudinal axis of the assembly.

The cylinder 171 is fed by way of a pipe 178 and a piston 179 is movable therein and biased rearwardly by a spring 180 which bears against the block 117, the latter having a passage for a rod 181. It will be understood that when liquid under pressure enters the cylinder 171 by way of the pipe 178, the piston 179 compresses the spring 180 and shifts the rod 181 which shifts the cam 131 forwardly. On the other hand, when the pressure ceases, the spring 180 acts on the piston 179 and the latter returns to its position of rest and expels the liquid. The cam 131 returns to its abutment 134 and urges the rod 181 back against the piston 179.

In a similar manner, the cylinder 172 has a pipe 182 (FIG. 16), a piston 183 (FIG. 15) and a spring 184. The piston 183 bears directly against the rear end 166 of the rod 165 so that when the liquid under pressure enters by way of the conduit 182, the piston 183 compresses the spring 184 and urges the rod 165 which actuates the lever 160. When the pressure ceases, these various elements resume their initial positions under the effect of the springs 164 and 184.

The cylinder 173 also has a conduit 185, a piston 186 and a spring 187. The piston 186 bears directly against the end 177 of the thrust element 138 and, when the liquid under pressure enters by way of the conduit 185, the piston 186 compresses the spring 187 and acts on the thrust element 138. Inversely, when the pressure ceases, these various elements resume their initial rear positions under the effect of the springs 146 and 177.

The cylinder 174 has an open rear end, a conduit 188 and a piston 189 which has no spring but is sufficiently long to bear against the abutment bar 178 (FIG. 8) which is connected to the plates 14 and 14a so that, when the liquid under pressure is supplied to the conduit 188, the piston 189 has a tendency to move out of the block 118. By way of reaction, it is the whole of mechanism G which moves away from the bar 78 in sliding between the plates 14 and 14a. When the pressure ceases, the springs 80 cause the mechanism G to resume its initial position between the plates and the piston 189 to move rearwardly into the cylinder 174.

After the foregoing description of the mechanism G it is now possible ot explain how the two fasteners 6 and 5a for binding the strings (which are brought together as already explained by the movement of the pressing means D, the retaining means E including the flaps 60 and the mechanism F) are mounted on the strings and pinched together. This explanation can even be pursued up to the ejection of the finished bundle or packet in passing through the string cutting stage. However, for the moment no description will be given of the details of the means employed for placing the fasteners in position in the mechanism F and controlling the various hydraulic circuits.

In the sequence of the operations the liquid under pressure is fed successively to:

(a) The conduit 185, which brings the lower fastener 6 to its position already described and shown in FIG. 16 through the action of the piston 186, the thrust element 138 and its ends 177 and 137.

(b) The conduit 188, which has for effect to shift the piston 189 outwardly of its bore 174 in the block 118 and, owing to the reaction on the bar 78 secured to the rear plates 14 and 14a, to slide the whole of the mechanism G between these plates towards the forward plates 13, 13a. The result of this operation is, at the start of the travel, to release the ramp 153 whose end 156 was retained by the bar 78 and, under the effect of the spring 154, to cause it to assume such position that the locking element 143 (biased by the spring 148) engages in the recess 142 in the thrust element 138 which is thus locked in position, and, at the end of the travel, to bring the upper fastener 5a (pertaining to the following packet) and the lower fastener 6 pertaining to the present packet respectively in abutment with the abutment 136 and with the end 137 of the thrust element 138 in contact with the four strings 9, 10, 11 and 12 which are parallel and in contact with each other so that the latter pass into the notches 116 of the fasteners and into the recess 140 of the block 117.

(c) The conduit 178, which shifts the piston 179, the rod 181 and the cam 131, the latter pivoting the levers 119a . . . 119d whose nose portions 135 thus pinch the fasteners around the four strings.

(d) The conduit 182, which causes the strings to be cut by the sharp edge 159 owing to the shifting of the piston 183, the rod 166, the lever 160 and the blade 157.

At the end of the last operation, three of the four hydraulic circuits just mentioned have their pressurized fluid supply cut off. They are connected to the tank 48 in the following order: first those pertaining to the conduits 178 and 182, then that pertaining to the conduit 188, which has for result to open the pinching jaws owing to the action of the springs 125, 133, withdraw the sharp edge 159 of the blade owing to the action of the spring 164, withdraw the mechanism G between the rear plates 14, 14a under the effect of the springs 80 and withdraw the locking element 143 from the thrust element 138 through the action of the abutment bar 78 on the end 156 of the cam 153.

These various elements having returned to their initial positions, the circuits relating to the conduits 106, 112 are connected to the tank 48. Their pressure drops to zero and the two pairs of fingers 107, 107a are separated by the action of the spring 115 while the two pairs of plates 13, 13a and 14, 14a move away from each other owing to the action of the spring 104. Meanwhile, the circuit relating to the conduit 33 is put under pressure and thus the cylinder 28 and the plate 25—which were already partially lowered by the packet or bundle in the course of its positioning in height under the flaps 60 by the pressing means D—are fully lowered.

Just before reaching the end of its travel the plate 25 encounters the fixed abutment 46 (FIG. 9) and is made to tip about the pin 26 (which assumes the position 26a) to the inclined position 25a and the packet or bundle slides out of the lateral opening 16 of the support A.

Once this has occurred and the finished bundle has been discharged, certain elements still have to be returned to their initial positions to permit tying up the following bundle. This is the reason why the circuits pertaining to the conduits 185 and 72, and then the conduit 33, are simultaneously connected to the tank 48 so that the spring 146 urges back the previously unlocked thrust element 138 while the spring 73a raises the flaps 60 and the spring 40 raises the plate 25.

(h) *Fastener feed device H*

A reserve supply of fasteners is provided on the machine in the form of two stacks 190, 191. In each stack, the fasteners are placed one on top of the other in the flat condition and have a common orientation, that is, the notches are superimposed. They are located in tubes 192 and 193 of a loader 194 which is disposed vertically and slidable in a guide 195 fixed by feet 196 (FIG. 8) to the inside of the front wall of the post 18. The loader 194 is freely movable in the guide 195 and slides downwardly under the effect of its own weight until it encounters the pinching mechanism G through the opening 83 formed in the upper rear plate 14. During the movements of the plates and the pinching means, its end 197 therefore rubs along the block 117 in a passage 198 (only a small portion of the passage is shown between two cutaway portions in FIG. 15). This passage has such depth that its bottom extends the upper part of the abutment 136 and is located in a plane very slightly lower than the lower part of the nose portions of the levers 107. Members 199 (FIG. 17–I) are connected to the plate 14 and close the gap between the latter and the passage 198. Further, an aperture 200 located at the rear of the abutment 136 extends through the block 117. The cross-sectional size of this apperture is a little larger than the area of one fastener so as to enable the stack 191 to reach the thrust element 138 when the tube 193 is located vertically thereabove. On the other hand, when this condition is obtained, which occurs at the end of the rearward movement of the rear plates 14, 14a, the wall 201 of the tube 192 is in alignment with the abutment 136.

As the description of the machine progressed, the operation of the various elements was explained. Their movements succeed each other in accordance with a certain cycle. Considering the latter towards the end of the cycle, it will be recalled that plates 13, 13a and the rear plates 14, 14a move away from each other and, in the course of their movement, the passage 198 of the block 117 slides under the end 197 of the loader 194. Moreover, if it is assumed that no fastener is in the pinching position in the pinching means but that the aperture 200 is full of fasteners and its height corresponds to a whole number thereof (for example five fasteners), the stack 202 thus formed passes towards the end of the travel in line with the pipe 192 and the last or bottom fastener 5 of the stack 190 slides onto the top fastener of the small stack 202, then onto the top of the abutment 136 and falls at the end of the movement in front of the abutment 136 in the pinching position (FIG. 17–I).

Simultaneously, the stack 191 is superimposed onto the small stack 202 so as to form a single stack. The last or bottom fastener of the large stack becoming contiguous with the top fastener of the small stack. It will be understood that the distance between the two tubes 192, 193 of the loader 194 has been so arranged as to obtain this result bearing in mind the distance between the aperture 200 and the abutment 136.

It is also clear that after the plates 13, 13a and 14, 14a have separated in the return of the last elements to their positions, there is a rearward movement of the thrust element 138 whose end 137 uncovers the aperture 200. This enables the small stack 202 followed by the stack 191 to drop into the aperture so that the lower fastener 6 comes in contact with the member 139 (FIG. 17–II). As the end 137 of the thrust element 138 has exactly the same thickness as a fastener, the fasteners therefore drop to this extent into the aperture 200. Thereafter, in the course of the following cycle, the plates 13, 13a and 14, 14a once more move towards each other and consequently the pinching means slide under the loader 194, the abutment 136 drawing along the top fastener 5 which is in the pinching position and the aperture 200 drawing along the small stack 202. It is finally the advance of the thrust element 138 which brings the fastener 6 into the pinching position by means of its end 137 which pushes the fastener and causes it to slide between the member 139 and the block 117 while itself sliding under the stack 202 (FIG. 17–IV).

(*i*) *Mechanism I driving the machine in cycles*

The machine comprises (FIGS. 8 and 18), disposed on a plate or deck 203 secured inside the support A: a distributing valve 204 driven by a camshaft 205 and a motor-speed reducer unit 206. The latter drives the camshaft 205 through a friction device comprising a driving plate 207 which slides on the output shaft 208 of the motor speed reducer unit but is driven by said shaft; friction means 209; a driven plate 210 connected to rotate with the camshaft 205 and having a notch 211 capable of engaging a stop pawl 212.

The driving plate 207 compresses the friction means 209 owing to the action of a spring 213 which bears against an abutment 214 rigidly secured to the shaft 208. The camshaft 205 rotates in the direction of arrow $f^4$ in two bearings of which only the bearing 215 is shown and against which the driven plate 210 bears axially through a thrust bearing 216.

The pawl 212 is mounted to pivot about a pin 217 in a fork 218 rigidly secured to the deck 203 and has a tail portion to the end of which is pivoted the piston plunger 219 of an electromagnet 220 which is secured to a bracket 221 welded to the deck 203. This electromagnet 220 starts up an operational cycle through the action of a manual control. The camshaft 198 drives nine cams 221 which are pinned to this shaft and around which roll rollers 222 carried by nine pushrods 223 (FIG. 19) forming part of the distributing valve 204.

Figure 18:
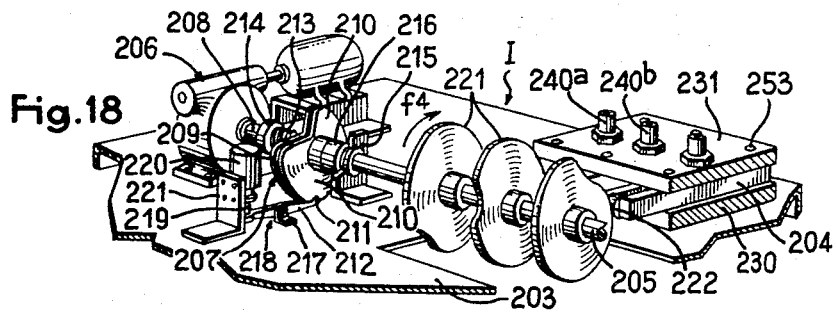
FIG. 18 is a perspective view of the unit driving and controlling the machine in cycles.

FIG. 18 shows only three cams and the part of the valve 204 corresponding thereto.

This distributor valve 204 (FIG. 19) comprises a massive rectangular-sided body the sides of which are perfectly machined and trued up. There are as many ground bores 224 in this body as there are pushrods, namely nine bores. The body further comprises two longitudinal recesses, 225, 226 formed in the lower face from the first bore 224 to the ninth bore, these recesses being, however, closed at both ends. A port is formed on the axis of each of these recesses and in alignment with each bore, namely a port 227 for the recess 225 and a port 228 for the recess 226. Eighteen apertures or ports are therefore provided.

Nine ports 229 each in alignment with each of the bores 224 are provided in the upper face of the body.

Attached to the distributing valve 204 are two plates 230, 231, the first plate 230 being placed against the lower face and the second 231 against the upper face. The plate 230 comprises two tapped holes 232 and 233 which are respectively in alignment with the recesses 225 and 226. Screwed in these holes are conduits 234 and 235 which extend through the deck 203, owing to the provision of suitable openings, when the assembly is mounted.

The conduit 234 corresponds to the port 232 and the recess 225 and is connected to the tank 48 by piping 236 (FIG. 8).

The conduit 235 corresponding to the port 233 and the recess 226 is connected to the motor-pump unit 47 by way of another piping 237 provided with a judiciously adjusted or rated relief valve 237a. The discharge to the tank 48 is by way of piping 238.

The plate 231 comprises nine tapped holes 239 in alignment with each of the ports 229. Screwed in these holes are nine conduits or nozzles 240a–240i (FIG. 10) which are connected by piping (which can be flexible) to the various elements of the machine, thus:

The conduit 240a is connected to the conduit 33 controlling the plate C.

The conduit 240b is connected to the conduit 57 controlling the pressing means D.

The conduit 240c is connected to the conduit 72 controlling the flaps 60.

The conduit 240d is connected to the conduit 106 controlling the plates 13, 13a and 14, 14a.

The conduit 240e is connected to the conduit 112 controlling the fingers 107–107a.

The conduit 240f is connected to the conduit 178 controlling the pinching jaws 119a–119b.

The conduit 240g is connected to the conduit 182 controlling the shears 175.

The conduit 240h is connected to the conduit 185 controlling the fastener thrust element 138.

The conduit 240i is connected to the conduit 183 controlling the advance of the mechanism G.

Figure 19:
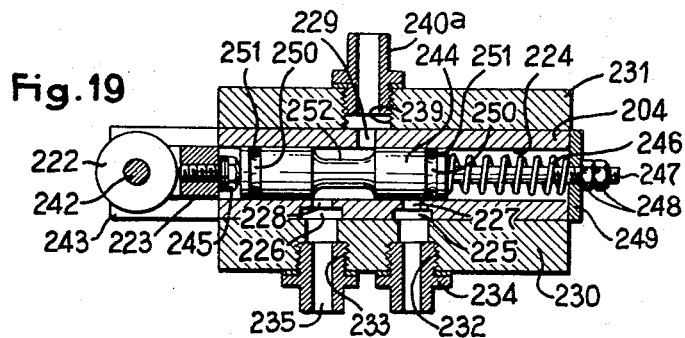
FIG. 19 is a longitudinal sectional view, taken along line 19—19 of FIG. 10.

Slidable in each bore 224 is therefore one of the push rods 223. It carries in a recess the roller 222 which rotates around a pin 242 and slides in a slot 243 (FIG. 19). It rolls along the profile of one of the cams 221 which is thinner than the roller and is engageable in the slot 243. In moving around the profile of the cam the roller shifts the push rod in the bore 224 and thus actuates a slide 244 through an abutment 245 against which the valve is maintained under pressure by a spring 246. A rod 247 retains the slide upon disassembly owing to the provision of nuts 248 which are in abutting relation to a member 249 fixed to the body of the distributing valve 204. The slide 244 has two grooves 250 in which are engaged suitable sealing elements 251 which ensure a seal between the slide and the bore 224. The slide also comprises a large distributing groove 252 which puts the corresponding conduit 240a–240i in communication either with the conduit 232 or with the conduit 233. This is achieved by the combination of the length and position of the groove with the judiciously selected positions of the ports 227, 228 and 229.

The elements 204, 230 and 231 are assembled by bolts, such as 253 (FIG. 18), which are located between the bores 224, some of these bolts being longer and serving to secure the assembly to the deck 203.

This central control mechanism I operates in the following manner:

Assuming that the motor-speed reducer unit 206 is operating, when current is supplied to the machine the driving plate 207 is rotated in the direction of arrow $f^4$ (FIG. 18) one rotation during a period (T) equal to one complete cycle of the operations corresponding to a tying up of a bundle or packet. This rotation exerts force through the friction means 209 on the driven plate 210 rigid with the camshaft 205, but the pawl 212 prevents any movement of this plate 210. It is only when the operator energizes the electromagnet 220 by depressing the starting up push button (not shown)—both of which form part of the same circuit (not shown)—that the camshaft starts to rotate. Thus the core moves and exerts a traction on the tail end of the pawl 212 and the latter disengages from the notch 211 and allows the plate 210 to rotate. As the action on the starting up pushbutton is of very short duration, the pawl rapidly resumes its position of rest so that the camshaft can only effect one rotation since the notch 211 is once more engaged by the pawl.

It will be understood that the profile of each of the nine cams 221 is so selected that in each binding or tying up cycle the position of each of the distributing valves is at each instant in the suitable position for ensuring the connection of the corresponding circuit, that is, the connection of the element it controls either with the hydraulic pump 47 (circuit under pressure) or with the tank 48 (circuit under no pressure).

III. OPERATION OF THE COMPLETE MACHINE

Assuming that the machine is receiving current, that is, that the motor controlling the hydraulic pump 47 and the motor-speed reducer unit 206 are operating, when a bundle 1 has just been tied up and another is about to be formed, the cycle of operations is finished and this means that the camshaft 205 has effected a complete rotation and is held stationary by the notch 211 of the plate 210 engaging the pawl 212.

At this instant, the plate C is in its upper position and so is the pressing means D. The flaps 60 of the retaining means E are vertical, the two pairs of plates 13, 13a and 14, 14a of the mechanism F are apart and the same is true of the two pairs of fingers 107, 107a. The pinching mechanism G is withdrawn rearwardly between the rear plates 14 and 14a. The fastener thrust element 138 is in its rear position, the locking element 143 being disengaged from the recess 142. The pinching jaws 119a–119d are apart. The cutting edge 159 of the shears 157 is outside the recess 140.

If a bundle 1 of a number of letters 2 is placed on the plate C supporting the four strings 9, 10, 11, 12 (FIG. 2) which are united at right angles by a fastener 5 mounted in the course of the preceding operation, and the starting up pushbutton is rapidly depressed, the electromagnet 220 acts on the pawl 212 and causes it to disengage from the notch 211 and allows the driven plate 212 to be rotated under the effect of the friction means 209 and thereby rotate the camshaft 205. The pawl resumes contact with the plate 210 behind the notch and therefore stops the camshaft at the end of one rotation, but in the course of this rotation the cams act on the distributing valve 204 in accordance with the time chart shown in FIG. 20 in which the length OT, plotted as abscissae, corresponds to the duration of one operational cycle corresponding to one rotation through 360° of the camshaft. In a prototype machine, the duration OT hardly exceeds four seconds. This cycle comprises the following successive steps or operations:

(a) The supply of fluid under pressure through the conduit 240b, which causes the pressing means D to descend fully. The bundle 1 is thus brought to the fastener-pinching position and compressed by the plate C which was caused to descend in stressing the spring 40. The four strings then assume a practically tangential position laterally against the bundle owing to the effect of their guides.

(b) Fluid under pressure is supplied by way of the conduit 240c and this pivots the flaps 60 and brings them to the horizontal position shown at 60a.

(c) The conduit 240b is connected to tank 48 and, under the effect of the spring 49 the pressing means D rise. The bundle 1 then bears against the horizontal flaps 60a, it being biased by the plate C under the effect of the spring 40.

(d) Fluid under pressure is supplied by way of the conduit 240d and this moves the two pairs of plates 13, 13a and 14, 14a towards each other and causes the two longitudinal strings 9, 10 to lie on top of the bundle 1 (FIG. 4).

(e) Fluid under pressure is supplied by way of the conduit 240e and this also urges the two pairs of fingers 107, 107a towards each other and brings the two transverse strings 11 and 12 on top of the bundle (FIG. 5).

(f) Fluid under pressure supplied by way of the conduit 240h causes the fastener thrust element 138 to move forwardly in the mechanism G and the bottom fastener 6 to advance. This bottom fastener takes up its position at the rear of the pinching jaws.

(g) Fluid under pressure supplied by way of the conduit 240i causes the mechanism G to move between the rear plates 14, 14a, places the two fasteners (top fastener 5 and bottom fastener 6) around the four strings grouped between the plates and locks the fastener thrust element 138 in its forward position.

(h) Fluid under pressure supplied by way of the conduit 240f causes the pinching jaws 119a–119b to move together and close the two fasteners 6, 5a which are thus clamped or pinched around the four strings at two levels.

(i) Fluid under pressure supplied by way of the conduit 240g brings into action the cutting edge 149 of the shear which, in travelling across the recess 140, cuts the four strings between the pinched fasteners 6 and 5a.

(j–j) Connection of the conduits 240f and 240g to the tank 48 which, under the effects of the springs 125 and 133, permits the pinching jaws (119a–119b) to move apart and the cutting edge 159 of the shear to withdrawn under the effect of the spring 164.

(k) The conduit 240i is connected to the tank 48 and this allows the pinching means G to withdraw under the action of the springs 80 with the result the fastener thrust element is unlocked.

(l) The conduits 240d and 240e are connected to the tank 48 and this causes the two pairs of plates 13, 13a and 14, 14a to be moved apart by the spring 104 and causes the two pairs of fingers 107, 107a to be moved apart by the springs 115. Further, a fastener is positioned at the end of the travel in the upper position of the pinching means G.

(m) Fluid under pressure supplied by way of the conduit 240a causes the plate C to descend to the end of its travel, the panel 25 thereof tilting and discharging the tied-up bundle.

(n) The connection of the conduit 240h to the tank 48 permits the fastener thrust element 138 to withdraw under the effect of the spring 146 and the bottom fastener 6 to place itself in position in front of the element 138.

(o) The connection of the conduit 240c to the tank 48 permits the flaps 60 to rise under the effects of the spring 73a.

(p) The connection of the conduit 240a to the tank 48 causes the plate C to rise under the effect of the spring 40.

At this moment, the cycle is finished and the various elements have resumed their initial positions together with the camshaft 205 which stops owing to the engagement of the pawl 212 in the notch 211.

The tying up or binding of a further bundle can now begin and so on.

In the foregoing description, a cycle of the machine has been described other than the first cycle in that it was assumed that at the start of the cycle the strings were already united by a lower fastener 5 in position at 5a with the upper fastener 6 of the preceding bundle. In order to place in position the first fastener 5 at the start of a series of cycles, so as to create the start of the cycle shown in FIG. 1, the operator can lower the plate C with one hand, pass the other hand through the opening 16 (FIG. 7) so as to hold the plate in its lowered position, assemble in the fingers of this hand the four portions of string and hold the junction points below the plane of the sliding plates. The starting up of one operational cycle of the machine produces the deposit of two fasteners 6 and 5a and the cutting of the binding elements or strings between these fasteners. The operator withdraws his hand in which remain the four portions of string and the fastener 6 and thus releases the plate C which rises to its position corresponding to the beginning of a cycle.

Although a specific embodiment of the invention has been described, many modifications and changes may be made therein without departing from the scope of the invention as defined in the appended claims.

The invention is also intended to cover cases in which there are two or three binding elements or more than four binding elements.

An air control mechanism could be employed instead of a hydraulic control mechanism.

Having now described my invention what I claim as new and desire to secure by Letter Patent is:

1. A method for placing a plurality of flexible ties around a bundle of articles, said method comprising the steps of: continuously supplying said ties to a frame having an opening in such manner that they converge to a common junction point above said frame opening, connecting said ties by a first fastener element at said junction point, despositing said bundle on a platform which is upwardly biased by elastically yieldable means, said ties being interposed between said bundle and said platform above said opening, exerting a downward pressure on said bundle in opposition to the biasing force exerted by said yieldable means so as to compress the bundle against said platform and urge it downwardly wholly below said opening whereby the edges of said frame defining said opening automatically raise said ties relative to said bundle towards the lateral faces of said bundle, placing said ties against said lateral faces and on top of said bundle, and bringing said ties to a common upper junction point, connecting said ties by a second fastener element at said common upper junction point, and cutting the ties on the side of said second fastener remote from said bundle.

2. A method as claimed in claim 1, further comprising the step of folding retaining means onto said bundle after having exerted said downward pressure thereon, said downward pressure being released subsequent to the folding of said retaining means.

3. A method for placing a plurality of flexible ties around a bundle of articles forming part of a plurality of bundles to be tied, said method comprising, for tying each bundle, the steps of: continuously supplying said ties to a frame having an opening in such manner that they converge to a common junction point above said frame opening, connecting said ties by a first fastener element at said junction point, depositing said bundle on a platform which is upwardly biased by elastically yieldable means, said ties being interposed between said bundle and said platform above said opening, exerting a downward pressure on said bundle in opposition to the the biasing force exerted by said yieldable means so as to compress the bundle against said platform and urge it downwardly wholly below said opening whereby the edges of said frame defining said opening automatically raise said ties relative to said bundle towards the lateral faces of said bundle, placing said ties against said lateral faces and on top of said bundle, and bringing said ties to a common upper junction point, connecting said ties by a second fastener element at said common upper junction point, said two connections of the ties being effected simultaneously by an upper fastener and a lower fastener in two vertically spaced planes, said lower fastener being said second fastener of the bundle being tied and said upper fastener being said first fastener of the following bundle, said method further comprising the step of cutting said ties between said first and second fasteners after said connections of said ties.

4. A machine for tying bundles of articles with a plurality of flexible ties, the ties of each tied-up bundle having a first connection point at the bottom of the bundle and a second connection point at the top of the bundle, said machine comprising in combination: a frame structure having an upper wall, an opening in said upper wall, means for continuously feeding and guiding the flexible ties in a taut condition to a first connection point so that said ties are divergent from said connection point, a bundle-receiving platform structure movable vertically downwardly from said opening, elastically yieldable means biasing said platform structure to an upper position in which it is substantially in the plane of said opening in said upper wall, vertically movable pressing means above said opening for compressing the bundle deposited on said platform structure on top of said ties so that the bundle and said ties move downwardly in opposition to the action of said yieldable means and edges defining said opening in said upper wall raise said ties toward the lateral faces of the bundle, a first mechanism under said upper wall and below said opening for forming said ties over onto the top of the bundle and a second mechanism for interconnecting said ties at an upper connection point and a lower conection point which are in vertically spaced relation to each other, said lower connection point corresponding to said second connection point of the ties of the bundle on said platform structure and said upper connection point corresponding to said first connection point of the ties of the following bundle, and means for cutting said ties between said upper and lower connection points.

5. A machine as claimed in claim 4, wherein the mechanism for folding over said ties comprises two pairs of superimposed plates, said pairs being capable of moving towards and away from each other in the longitudinal direction of the machine so as to fold over onto the bundle two longitudinal ties, and two lateral pairs of levers, pivotally mounted between the two plates of one of said pairs of plates, for folding over two transverse ties.

6. A machine as claimed in claim 4, further comprising means for bearing against the bundle on the platform structure, said means being so arranged that said ties do not encounter said bearing means.

7. A machine as claimed in claim 6, wherein said bearing means comprise pivotable flaps which are foldable onto the bundle.

8. A machine as claimed in claim 4, comprising means for imparting to said platform structure carrying the bundle a further downward movement after said ties are cut by said cutting means, so as to discharge the tied bundle.

9. A machine as claimed in claim 4, wherein said platform structure comprises a vertically movable support, a bundle-carrying plate pivotally mounted on said support, an abutment which is fixed relative to said frame structure and positioned to be encountered by said plate toward the end of the downward travel of said movable support so that said plate is tilted at the end of the downward travel of said support and discharges the bundle through a lateral opening in said frame structure.

10. A machine as claimed in claim 4, comprising means supplying fluid under pressure, piping connecting said fluid supply means to said pressing means, said first mechanism, said second mechanism, and said tie-cutting means, and a distributing valve device inserted in said piping to control the supply of said fluid.

11. A machine as claimed in claim 10, comprising a camshaft, driving means, a friction clutch for interconnecting the driving means and the camshaft, a stop pawl associated with the camshaft and operative to allow a single rotation of said camshaft at a time, electromagnetic means for controlling the action of said pawl, said camshaft having a plurality of cams operatively connected to a plurality of slides in said distributing valve device so as to supply said fluid in a predetermined sequence in each operational cycle of said machine, said cycle corresponding to one rotation of said camshaft.

12. A machine for tying up bundles of articles with four flexible ties so that in the tied-up bundle the ties are interconnected at a first connection point under the bundle and at a second connection point on top of the bundle, said machine comprising in combination a frame structure having an upper wall, an opening in said upper wall, means for continuously supplying and guiding said four flexible ties in four directions in a taut condition to a junction point above said opening so that said ties are divergent from said junction point at 90° to each other, two ties being longitudinal ties and two ties being transverse ties, a bundle-receiving platform structure movable downwardly from said opening, yieldable means biasing said platform structure to an upper position in which it is substantially in the plane of said opening, pressing means above said opening for exerting a downward pressure on the bundle placed on top of said ties on said platform structure so that the bundle and platform structure are shifted downwardly to a lower position in which the bundle is completely below said upper wall whereby edges of said upper wall defining said opening raise said four ties upwardly toward four lateral faces of the bundle, retaining flaps downwardly foldable onto the bundle in said lower position of the bundle and platform structure so as to retain the bundle in said lower position, two pairs of vertically spaced upper and lower plates mounted below said upper wall to move in a horizontal plane between an outer separated position to an inner position in which said longitudinal ties are folded by said pairs of plates onto the top of the bundle, movable shifting elements located between said upper and lower plates of one of said pairs of plates and movable between an outer separated position and an inner position in which the shifting elements fold said transverse ties onto the top of the bundle, means located between said upper and lower plates for supply an upper fastener and a lower fastener to portions of said four ties extending between said upper plates and lower plates, fastener securing means located between said upper and lower plates for securing said fastener around said four ties so as to rigidly interconnect said four ties at a lower connection point corresponding to said second connection point of the bundle in the course of being tied up and an upper connection point corresponding to said first connection point of the following bundle to be tied up, cutting means located between said upper and lower plates for cutting said four ties between said upper fastener and lower fastener, and driving means operatively connected to said pressing means, said flaps, said pairs of plates, said shifting elements, said fastener supply means, said fastener securing means and said cutting means to effect the following sequence of operations: lower said pressing means to cause said bundle and platform structure to reach said lower position, thereafter fold over said retaining flaps onto the bundle, thereafter raise said pressing means, thereafter shift said pairs of plates and said shifting elements to said inner positions thereof, thereafter actuate said fastener supply means, thereafter actuate said fastener securing means, and thereafter actuate said cutting means.

References Cited

UNITED STATES PATENTS

| | | |
|---|---|---|
| 838,392 | 12/1906 | Dulin. |
| 2,916,985 | 12/1959 | Beach _____ 100—218 XR |
| 3,080,811 | 3/1963 | Freudling et al. __ 100—17 XR |
| 3,245,634 | 4/1966 | Schooler. |

BILLY J. WILHITE, *Primary Examiner.*